(12) United States Patent
Goto

(10) Patent No.: US 7,699,342 B2
(45) Date of Patent: Apr. 20, 2010

(54) CURTAIN AIR BAG FOR VEHICLES

(75) Inventor: Norimasa Goto, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 510 days.

(21) Appl. No.: 11/213,718

(22) Filed: Aug. 30, 2005

(65) Prior Publication Data

US 2006/0071460 A1     Apr. 6, 2006

(30) Foreign Application Priority Data

Aug. 30, 2004   (JP) ............................. 2004-250679

(51) Int. Cl.
  *B60R 21/20* (2006.01)
(52) U.S. Cl. .................................. 280/730.2
(58) Field of Classification Search ................ 280/729, 280/730.2, 743.1, 749
  See application file for complete search history.

(56) References Cited

U.S. PATENT DOCUMENTS

| | | | | |
|---|---|---|---|---|
| 6,010,149 A | * | 1/2000 | Riedel et al. | 280/730.2 |
| 6,273,457 B1 | * | 8/2001 | Fischer | 280/730.2 |
| 6,290,253 B1 | * | 9/2001 | Tietze et al. | 280/730.2 |
| 6,672,612 B2 | * | 1/2004 | Sauer et al. | 280/730.2 |
| 7,144,038 B2 | * | 12/2006 | Keshavaraj | 280/743.1 |
| 2004/0056456 A1 | | 3/2004 | Ikeda et al. | |

FOREIGN PATENT DOCUMENTS

| JP | 2004-034766 A | 2/2004 |
|---|---|---|
| WO | WO-2005039938 A1 * | 6/2005 |

* cited by examiner

*Primary Examiner*—Paul N Dickson
*Assistant Examiner*—Robert A Coker
(74) *Attorney, Agent, or Firm*—Sughrue Mion, PLLC

(57) ABSTRACT

A curtain air bag formed so that an auxiliary inflatable chamber adapted to reduce to as great an extent as possible a substantial decrease in a protective region of an air bag body 1 can be formed. The air bag body 1 is deployed into the interior of an automobile 8 by introducing a high-pressure gas, which is ejected from an inflator at the time of the occurrence of collision of the automobile 8 with something, into the interior of the air bag body. An auxiliary inflatable chamber 5 defined with respect to a main inflatable chamber 3 is obtained by sewing the air bag body by a substantially one sewing line using a multi-thread chain stitch method or the like. The auxiliary and main inflatable chambers 5, 3 are communicated with each other via a narrow orifice type gas flow restriction passage 6.

5 Claims, 1 Drawing Sheet

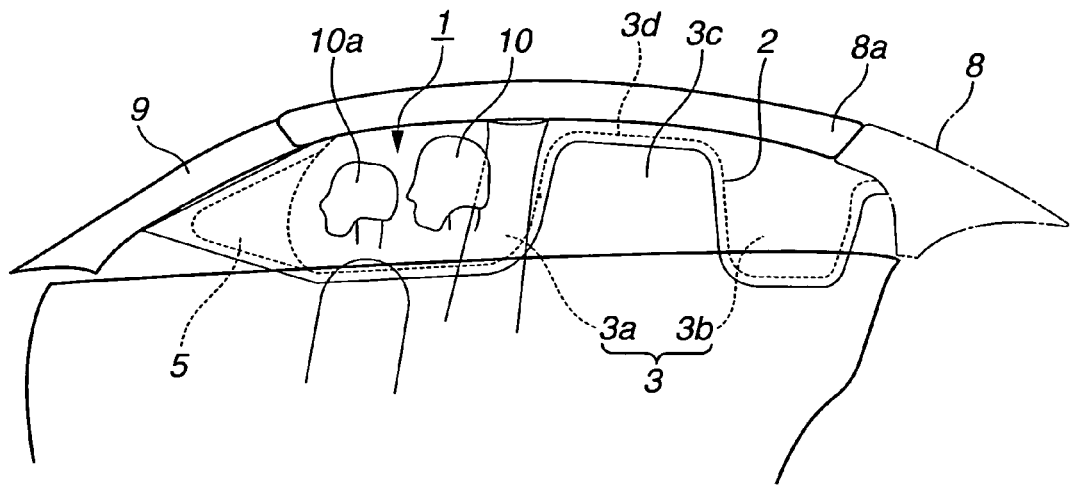

CURTAIN AIR BAG FOR VEHICLES

BACKGROUND OF THE INVENTION

1. Field of the Invention

This invention relates to a curtain air bag for vehicles, adapted to protect crew against a shock occurring when a vehicle is collided.

2. Description of the Related Art

The related art air bags adapted to protect crew (seat occupants) against a shock occurring when collided in the longitudinal direction, and an air bag adapted to protect crew against a shock occurring when collides, and against an impact occurring when the vehicle rolled over.

Out of these air bags, the air bag adapted to protect a passenger against an impact occurring when collided (side collision) with a side of a vehicle, or against an impact occurring when the vehicle is rolled over is stored in a folded state in side portions of a roof of the vehicle. When a vehicle is collided or is rolled over, a high-pressure gas is ejected from an inflator, by which gas the air bag is deployed in a curtain-like shape along an inner side surfaces of the interior of the vehicle. For this reason, this type of air bag is called a curtain air bag.

There is a known curtain air bag of this kind (see Japanese Patent Laid-open Publication No. JP-A-2004-34766 and corresponding U.S. patent application Publication US 2004/0056456 A1), in which a main inflatable chamber is formed by mutually communicating a front protective area and a rear protective area with each other. An auxiliary or minor inflatable chamber is formed in a portion of the air bag which is arranged between the front protective area and the rear protective area. The front protective area is communicated with the auxiliary inflatable chamber via a vent hole 31. Therefore, when the inner pressure of the main inflatable chamber increases due to a load by which the deployed air bag restrains the crew, a part of the gas in the main inflatable chamber formed by the front and rear protective areas is made to flow into the auxiliary inflatable chamber via the vent hole to thereby cause the pressure in the main inflatable chamber to decrease. As a result, the occurrence of a rebounding phenomenon is avoided by reducing a peak acceleration which the crew receives.

However, in the above-described related art curtain air bag, a partition wall defining the main inflatable chamber and auxiliary inflatable chamber as well as the partition wall defining the front protective area and the rear protective area in the main inflatable chamber are formed by sewing an air bag body by two sewing lines separated from each other. Therefore, the partition walls are necessarily formed so as to have a predetermined substantial width.

As a result, in the related art curtain air bag, a substantial protective area with respect to the crew decreases due to the existence of the partition wall between the main inflatable chamber and the auxiliary inflatable chamber as well as the partition wall defining the front protective area and the rear protective area.

SUMMARY OF THE INVENTION

Under the circumstances, the present invention aims at providing in view of these points a curtain air bag for vehicles designed so that an auxiliary or minor inflatable chamber, in which a decrease in the substantial protective region of the air bag body is minimized to as great an extent as possible, can be formed.

According to the present invention, there is provided a curtain air bag adapted to deploy along an interior surface of a vehicle by an expansion gas from an inflator. This curtain air bag comprises:

a main base cloth laminated and sewn together to form a pouch shape;

a sewing line connecting the main base cloth, said sewing line forming a substantially one sewing line;

a main inflatable chamber inflatable by the gas;

an auxiliary inflatable chamber formed adjacent to the main inflatable chamber; and a partition line providing a partition between the main chamber and the auxiliary chamber and having a gas flow restriction passage communicating the main inflatable chamber and the auxiliary inflatable chamber.

BRIEF DESCRIPTION OF THE DRAWINGS

The object as well as the advantageous features of the invention will become apparent from the following description of the preferred embodiment taken in conjunction with the accompanying drawings, wherein:

FIG. 1 is a schematic diagram in side elevation of a principal portion of an automobile illustrating the deployed condition of the curtain air bag employing a mode of embodiment of the present invention;

FIG. 2 is a plan view showing the deployed condition of the curtain air bag employing the mode of the same embodiment; and FIG. 3 is a graph showing the relation between the inflation time of the curtain air bag and the inner pressure thereof in the inflation process of the curtain air bag employing the mode of the same embodiment.

DESCRIPTION OF THE PREFERRED EMBODIMENTS

According to the present invention, a curtain air bag is provided which is formed so that an air bag body is deployed into the interior of the vehicle by introducing a high-pressure gas, which is ejected from an inflator when a vehicle is collided, into the air bag body, wherein an auxiliary or minor inflatable chamber defined with respect to the main inflatable chamber is sewn by substantially one sewing line using, for example, a multi-thread chain stitch method. The auxiliary inflatable chamber and the main inflatable chamber are communicated with each other via a narrow orifice type gas flow restriction passage.

According to the present invention formed as described above, the auxiliary expansion chamber formed by partitioning the main expansion chamber is sewn by a substantially one sewing line using, for example, a multi-thread chain stitch method. Therefore, the partition wall defining the main inflatable chamber and auxiliary inflatable chamber can be formed so that the partition wall does not have a substantial width. As a result, a decrease in the substantial protective area of the air bag with respect to the crew (seat occupant) can be prevented.

One embodiment of the present invention will now be described with reference to the drawings.

Referring to FIGS. 1 and 2, a curtain air bag body 1 is provided with a bag type structure to receive or accommodate a high-pressure gas ejection. It is formed with a main inflatable chamber 3 that is inflatable by the high-pressure gas, which has a front protective area 3a and a rear protective area 3b, by sewing a plurality (e.g., two) of sheets of laminated base clothes, which are elongated from the front to the rear of a vehicle, by substantially one sewing line using, for example, a multi-thread chain stitch method, with a seal member 11 of a belt-like cloth interposed between circumferential portions of the laminated base clothes.

Between the front protective area 3a and the rear protective area 3b, a non-inflatable portion 3c is provided, and the front protective area 3a and the rear protective area 3b are communicated with a gas introduction passage 3d which is used to introduce thereinto a high-pressure gas ejected from an inflator (not shown) upon collision.

In the front protective area 3a and the rear protective area 3b, a plurality of seamed portions 3e restricting the main inflatable chamber so that the main inflatable chamber as a whole is deployed flat are formed by substantially one sewing line 2a each, for example, by a double sewing method with a seal member 11a also made of a belt-like cloth provided in the seamed portions 3e.

In a front end portion of the front protective area 3a, the auxiliary inflatable chamber 5 is formed adjacent to the main inflatable chamber 3 and is defined by substantially one sewing line 4 with the seal member 12 also made of a belt-like cloth provided thereon. The auxiliary inflatable chamber 5 is formed ahead of the main inflatable chamber 3 and on a side of a front pillar of the vehicle. The auxiliary inflatable chamber 5 and the front protective area 3a are communicated with each other via a narrow orifice type gas flow restriction passage 6 of the partition wall.

The operation of the curtain air bag of the embodiment will now be described.

The curtain air bag body 1 is fixed to a roof side rail 8a of an automobile 8 via a plurality of brackets, 7 secured at suitable intervals to an outer circumferential portion of the air bag body 1. The air bag body 1 is usually folded by rolling the same from a lower portion thereof in the shape of a roll, and held between the roof side rail 8a and a roof trim (not shown) with the folded air bag body stored in a cylindrical sack (not shown). The gas introduction passage 3d is joined to the inflator (not shown), and a front end portion of the curtain air bag body 1 is fixed to a pillar 9 by a connecting string 1a.

When the automobile 8 in such a normal condition is collided at a side portion thereof, or is rolled over, a detecting means (not shown) detects this impact to operate the inflator.

When the inflator is operated, the high-pressure gas introduced into the introduction passage 3d, deploys first into the introduction passage 3d along an upper edge of the curtain air bag body 1, so that the roof trim is forced to be opened into the interior of the vehicle.

Then the gas passes through the gas introduction passage 3d deployed thereby, and the front protective area 3a positioned ahead of the introduction passage receives momentarily a forward driving force due to the inflation of the front protective area, which is moved forward to then cause the rear protective area 3b as well to be deployed.

As a result, the front protective area 3a protects the head of crew 10 sitting on the portion of the front seat, which is between the crew 10 sitting on the front seat and an inner surface of the interior of the vehicle. The rear protective area 3b protects (between the time at which the inner pressure of the curtain air bag body 1 comes up from a point A in FIG. 3 to that B therein) the head of crew (not shown) sitting on the rear seat.

During this time, a tightening force due to the inflation of the main inflatable chamber 3 occurs, and the gas restriction passage 6 is put in a substantially closed state since the auxiliary inflatable chamber 5 and the front protective area 3a are communicated with each other via the narrow orifice type gas flow restriction passage 6. Therefore, the inflow of the high-pressure gas does not occur in the auxiliary inflatable chamber 5.

When the tightening force due to the inflation of the main inflatable chamber 3 attains a predetermined pressure (for example, 50 kPa on a one-dot chain line in FIG. 3), the gas flow restriction passage 6 is forcibly opened, and the high-pressure gas flows gradually into the auxiliary chamber 5 to deploy the same. With this, it is possible to maintain the inner pressure of the main inflatable chamber 3 at a predetermined pressure.

Since the gas flow restriction passage 6 is a very narrow passage hole displaying a narrow orifice-like appearance, it takes much time to have the inner pressure of the main inflatable chamber 3 and that of the auxiliary inflatable chamber 5 become equal to each other.

When the auxiliary inflatable chamber 5 is not provided, the inner pressure in the main inflatable chamber 3 increases rapidly as shown by a broken line in FIG. 3 but, since the auxiliary chamber 5 is provided, this inner pressure in the main inflatable chamber 3 can be retained at a level in the vicinity of a predetermined level after a point B shown by a solid line.

In short, in the initial stage of the lateral collision, the value of the inner pressure of the auxiliary chamber 5 was considerably low as compared with that of the inner pressure of the main chamber 3. During this time, the crew 10a, such as a short person sitting on a front seat can be protected without the occurrence of a rebounding phenomenon.

Thus, the main inflatable chamber 3 and the auxiliary chamber 5 are joined together adjacently by the gas flow restriction passage 6 made of a narrow orifice type passage, and the gas flow restriction passage 6 is tightened by the tension of the first deployed main inflatable chamber 3. A rapid increase in the inner pressure of the main inflatable chamber 3 is thus prevented. This enables suitable protection characteristics to be obtained easily without applying a complicated control mechanism formed by metal parts including a valve unit and a means for controlling the valve unit to the inflatable members.

Moreover, the main inflatable chamber 3 is formed by laminating a plurality of base clothes and then by sewing the circumferential portion of the resultant clothes by a substantially one sewing line 2 using a multi-thread chain stitch or the like. The auxiliary inflatable chamber 5 is also formed by sewing the same fabrics by a substantially one sewing line 4 using a multi-thread chain stitch or the like. Due to the conjoint effect of the formation of these main and auxiliary inflatable chambers, the partition wall defining these inflatable chambers can be formed as a wall which does not have a substantial thickness. As a result, a decrease in the substantial protective area of the curtain air bag body 1 with respect to the crew can be prevented.

The main inflatable chamber 3 of the air bag body 1 is formed at least at a position beside a head of a passenger seated on a vehicle front seat. Preferably, it is formed at a position beside a head of an AF05 dummy seated front most on a vehicle front seat. In other words, the partition wall, which provides a partition between the main inflatable chamber 3 and the auxiliary inflatable chamber 5, is formed at a position in front of a head of an AF05 dummy seated frontmost on a vehicle seat In the above-described mode of the embodiment, the auxiliary inflatable chamber 5 is obtained by partitioning the main inflatable chamber in the front portion of the front protective area 3a but the invention is not limited to such a method of forming the auxiliary inflatable chamber 5. For example, the auxiliary inflatable chamber 5 may be formed in the part of the air bag which has the non-inflatable portion 3c.

As described above, the auxiliary inflatable chamber obtained by partitioning the same chamber in the front portion of the front protective area is formed by sewing the air bag body by a substantially one sewing line using a multi-thread chain stitch method or the like. Therefore, the partitioning wall of the main and auxiliary inflatable chambers can be formed as a wall, which does not have a substantial thickness, so that a decrease in the substantial protective area for the passengers can be prevented. Therefore, the invention is suitable as a curtain air bag for protecting the passengers against an impact occurring at the time of collision of the automobile.

The entire contents of basic Japanese Patent Application 2004-250679 (filed Aug. 30, 2004), of which priority is claimed in the present application, are incorporated herein by reference.

What is claimed is:

1. A cuff am air bag operative to deploy along an interior surface of a vehicle by an expansion gas from an inflator, the curtain air bag comprising:
   a main laminated base cloth, portions thereof being sewn together to form a pouch shape;
   a sewing line connecting the portions of the main base cloth, said sewing line forming a substantially one sewing line;
   a main inflatable chamber inflatable by the gas;
   an auxiliary inflatable chamber formed adjacent to the main inflatable chamber; and
   a plurality of partition lines and a seal member providing a partition between the main chamber and the auxiliary chamber said partition lines extending from different locations on said sewing line and defining between terminated distal ends thereof a gas flow restriction passage communicating with the main inflatable chamber and the auxiliary inflatable chamber.

2. A curtain air bag according to claim 1, wherein the auxiliary inflatable chamber is formed ahead of the main inflatable chamber and on a side of a front pillar of the vehicle.

3. A curtain air bag according to claim 1, wherein the sewing line is formed by a multi-thread chain stitch.

4. A curtain air bag according to claim 1, wherein the main inflatable chamber is arranged to cover a side of a head of a crew, seated in a front seat adjusted at a front-most position.

5. A cuff am air bag operative to deploy along an interior surface of a vehicle by an expansion gas from an inflator, the curtain air bag comprising:
   a main laminated base cloth, portions thereof being sewn together to form a pouch shape;
   a sewing line connecting the portions of the main base cloth, said sewing line forming a substantially one sewing line;
   a main inflatable chamber inflatable by the gas;
   an auxiliary inflatable chamber formed adjacent to the main inflatable chamber; and
   a plurality of partition lines providing a partition between the main chamber and the auxiliary chamber said partition lines extending from different locations on said sewing line and defining between distal ends thereof a gas flow restriction passage communicating with the main inflatable chamber and the auxiliary inflatable chamber,
   wherein the gas flow restriction passage is substantially closed by tension due to an inflation of the main inflatable chamber and is forcibly opened when an internal pressure of the main inflatable chamber reaches a predetermined pressure, and the internal pressure of the main inflatable chamber is substantially maintained at the predetermined pressure.

* * * * *